United States Patent

Link

[15] 3,654,819

[45] Apr. 11, 1972

[54] SPEED CHANGE TRANSMISSION

[72] Inventor: Helmut Link, Esslingen/Neckar, Germany

[73] Assignee: Index-Werke KG Hahn & Tessky, Esslingen/Neckar, Germany

[22] Filed: Sept. 2, 1970

[21] Appl. No.: 68,855

[30] Foreign Application Priority Data

Sept. 10, 1969 Germany.....................P 19 45 721.7

[52] U.S. Cl.................................................74/360, 74/325
[51] Int. Cl.........................................F16h 3/08, F16h 3/00
[58] Field of Search....................................................74/360

[56] References Cited

UNITED STATES PATENTS

| | | | |
|---|---|---|---|
| 2,953,942 | 9/1960 | Schwartz et al. | 74/360 X |
| 3,232,125 | 2/1966 | Lee et al. | 74/360 X |
| 3,344,679 | 10/1967 | Zeller | 74/360 |
| 3,377,876 | 4/1968 | Finke et al. | 74/360 |
| 3,465,609 | 9/1969 | Fisher et al. | 74/360 |

*Primary Examiner*—Arthur McKeon
*Assistant Examiner*—Thomas C. Perry
*Attorney*—Michael S. Striker

[57] ABSTRACT

A speed change transmission including four transmission shafts, six transmission gears, six clutch means, and change gears, is arranged in such a manner that at the output shaft, four reversable different speeds are obtained.

10 Claims, 9 Drawing Figures

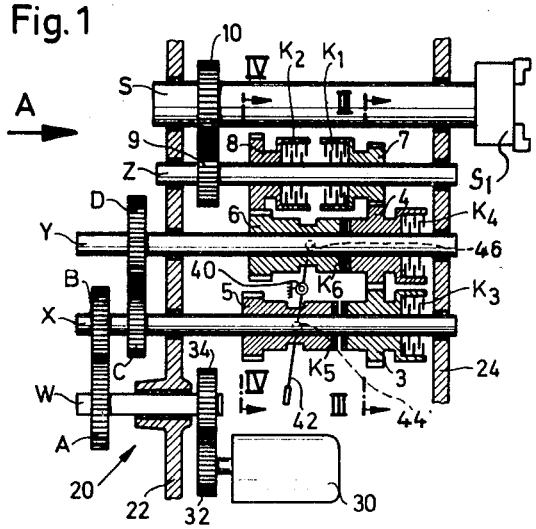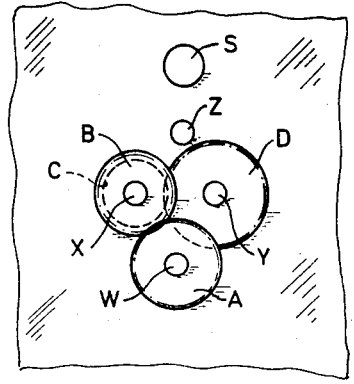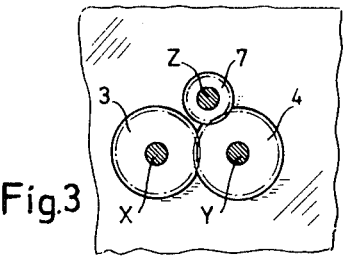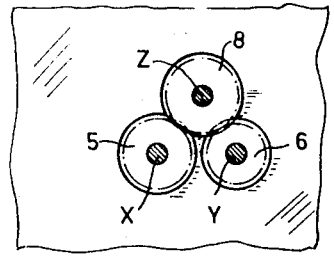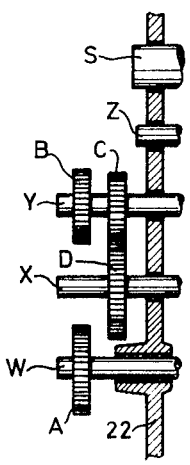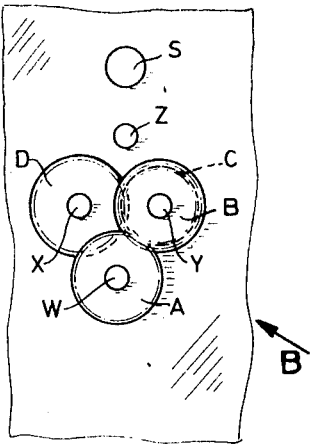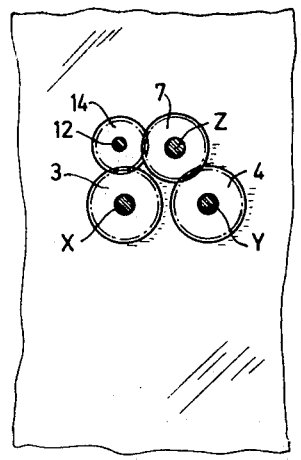

SPEED CHANGE TRANSMISSION

BACKGROUND OF THE INVENTION

The present invention is concerned with a speed change transmission which is particularly suited for machine tools and obtains four different reversable speeds.

A transmission is known which serves the same purpose, but requires a great number of transmission gears.

SUMMARY OF THE INVENTION

It is one object of the invention to overcome this disadvantage of the prior art transmissions of the type with which the present invention is concerned, and to provide a transmission of simple and inexpensive construction by which four different speeds are obtained in either direction of rotation.

Another object of the invention is to provide a speed change transmission requiring a smaller number of transmission gears and known transmissions serving the same purpose.

One embodiment of the invention comprises first, second, third and fourth transmission shafts; change gears fixed on the transmission shafts; fixed transmission gears including first and fourth transmission gears rotatably mounted on the second transmission shaft, second and fifth transmission gears rotatably mounted on the third transmission shaft, and third and sixth transmission gears rotatably mounted on the fourt transmission shaft.

The first transmission gear is connected with the second transmission gear for driving the same, and the second transmission gear meshes with the third transmission gear. The fourth and fifth transmission gears mesh with the sixth transmission gear.

The first and second transmission gears have the same number of teeth, and the fourth and fifth transmission gears have also the same number of teeth.

The transmission further comprises six clutch means including first, second and third clutch means for selectively coupling the first transmission gear with the second transmission shaft, the second transmission gear with the third transmission shaft, and the third transmission gear with the fourth transmission shaft, respectively, fourth and fifth clutch means for selectively coupling the first with the fourth transmission gear, and the second with the fifth transmission gear, respectively, and sixth clutch means for selectively coupling the sixth transmission gear with the fourth transmission shaft.

By operation of the six clutch means and the change gears, the fourth transmission shaft is operable at four different speeds in forward and rearward directions.

In the preferred embodiment, only a single change gear is secured to the first transmission shaft.

As compared with the prior art, the speed change transmission of the invention saves at least three, or when a double gear is considered to be two gears, four transmission gears are saved. Furthermore, mounting means for a gear, a clutch with operating means, and a respective bearing are omitted which is due to the fact that in the transmission of the prior art, the clutch means are provided on four transmission shafts, while in accordance with the present invention the clutch means are provided only on three transmission shafts so that one of the transmission shafts of the apparatus of the invention, is not associated with clutch means.

An advantage of the invention is that the second and third transmission shafts, with the clutch means and transmission gears mounted thereon, form two substantially identical units which reduces the cost of manufacture and storage.

Due to design considerations, and in view of the desired transmission ratios, it is not always possible to permit direct meshing of the first transmission gear with the second transmission gear. In order to obtain a positive mechanical connection between the first and second transmission gears, an intermediate gear may be used which meshes with the first and third transmission gears, and is mounted on an additional shaft.

While it is possible to use the fourth transmission shaft, on which two transmission gears and two clutch means are mounted, as output shafts of the transmission, a modified arrangement of the invention provides an additional output shaft which is connected by meshing gears to the fourth transmission shaft.

In order to permit a shifting of the transmission including reversal of the fourth transmission shaft, all clutch means are advantageously constructed in such a manner that they can be shifted during operation of the transmission. For example, disc clutches may be used. For practical purposes, it is generally sufficient, if only the first, second, third, and sixth clutch are clutches of the type permitting shifting during operation, while the fourth and fifth clutches can be shifted while the transmission is at a standstill, usually by manual operation, so that the fourth and fifth clutches may be claw or dog clutches.

A particular advantage of the transmission of the invention reside in that the operation of certain clutches which are constructed as friction clutches, the fourth transmission shaft, or an output shaft driven by the same, can be stopped. This takes place when the two clutch means on the fourth transmission shaft, and also the fourth and fifth clutch means are simultaneously operated. The respective output shaft can be stopped in this manner, while the motor driving the first transmission or input shaft continues to rotate.

Another preferred construction of the invention provides all change gears on one side of a partition of the supporting frame in which the transmission shafts are mounted. The shafts carrying the change gears, have portions projecting from the partition and having the change gears fixed thereon.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a schematic sectional view exploded in the plane of the drawing for the sake of greater clarity;

FIG. 2 is a fragmentary end view taken in the direction of the arrow A in FIG. 1;

FIG. 3 is a fragmentary sectional view taken on line III—III in FIG. 1;

FIG. 4 is a fragmentary sectional view taken on line IV—IV in FIG. 1;

FIG. 5 is a fragmentary end view corresponding to FIG. 2, but illustrating another arrangement of change gears;

FIG. 6 is a sectional view taken in the direction of the arrow B in FIG. 5, and being exploded in the manner of FIG. 1;

FIG. 7 is a fragmentary sectional view corresponding to the section of FIG. 3, but illustrating a modified arrangement of the transmission gear;

DESCRIPTION OF THE PREFERRED EMBODIMENTS

Figure 8:
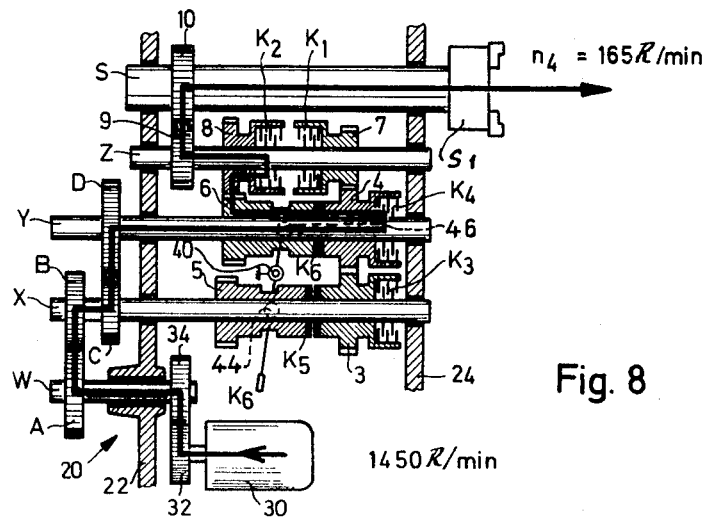
FIG. 8 is a sectional exploded view corresponding to FIG. 1 but including a line schematically indicating the path of the force transmitted by the transmission rotating in forward direction at the lowest speed of the output shaft.

Referring now to the drawing, and particularly to the embodiment of FIGS. 1 to 4, a supporting frame 20 including two supporting and partitioning walls 22 and 24 supports in bearings, which are only schematically shown, five shafts, namely a first transmission shaft W, a second transmission shaft X, a third transmission shaft Y, a fourth transmission shaft Z, and an output shaft S which may carry a chuck $S_1$ for a workpiece.

All shafts, with the exception of the first transmission shaft W, are mounted in two bearings in walls 22 and 24, the construction of the bearing being only schematically shown.

A drive motor 30 has a motor shaft carrying a gear 32 meshing with a gear 34 which is fixed to the first transmission shaft W. A change gear A is detachably fixed on the first transmission shaft W, and meshes with a change gear B mounted on the second transmission shaft X, which carries another change gear C meshing with a change gear D on the third transmission shaft Y. It will be seen that all change gears are mounted on projecting shaft portions outside of the partition wall 22, and are consequently easily accessible.

The second transmission shaft X is mounted in both walls 22 and 24 and carries freely rotatable a first transmission gear 3, and a fourth transmission gear 5.

In the present application, the term "change gear" will be used to describe gears which are fixedly secured to the respective shaft for rotation with the same, but which may be replaced by other gears. The term "transmission gear" is used for describing gears which are freely rotatably mounted on the respective shaft.

The first transmission gear 3 can be coupled by means of a first clutch $K_3$ with a second transmission shaft X. The first clutch means $K_3$ is schematically shown to be a disc clutch, the respective transmission gear 3 is secured with an outer group of lamellae, and the respective second transmission shaft X carries fixed inner lamellae of the first clutch means $K_3$. Clutch means $K_1$, $K_2$, and $K_4$ are constructed in the same manner. A fourth clutch means $K_5$ is provided on the second transmission shaft X, and has one coupling half secured to the first transmission gear 3 and a second coupling half connected with the fourth transmission gear 5 so that upon operation of the fourth clutch means $K_5$, the transmission gears 3 and 5 are coupled with each other.

The third transmission shaft Y rotatably supports a second transmission gear 4 and a fifth transmission gear 6. The second transmission gear 4, which meshes with the first transmission gear 3, can be connected by a second clutch means $K_4$ with the third transmission shaft Y. A fifth clutch means $K_6$ can be operated to couple the fifth transmission gear 6 and the second transmission gear 4 with each other.

The fourth clutch means $K_5$ and the fifth clutch means $K_6$ are preferably constructed as claw or dog clutches, and are operated by a clutch control lever 42 to move in opposite directions so that clutch means $K_5$ connects transmission gears 3 and 5 when clutch means $K_6$ is inoperative, and vice versa. The clutch control lever 42 is connected in the conventional manner by a forked end portion with an annular groove in the respective clutch half, as schematically indicated at 44 and 46.

The fifth transmission gear 6 meshes with a sixth transmission gear 8, which also meshes with the fourth transmission gear 5, as shown in FIG. 4. The second transmission gear 4 meshes with a third transmission gear 7. Transmission gears 7 and 8 are both rotatably mounted on the fourth transmission shaft Z, and can be coupled by a sixth clutch means $K_2$, and by a third clutch means $K_1$, respectively, with the fourth transmission shaft Z.

As noted above, all gears to which reference is made as "transmission gears" are rotatably mounted on the respective shaft. Excepting the fourth and fifth transmission gears 5 and 6, respectively, all other transmission gears are non-movable in axial direction on the respective shaft, while the fourth and fifth transmission gears 5 and 6 may be shifted in axial direction by actuation of the fourth and fifth clutches $K_5$ and $K_6$. This illustrated construction has been chosen for the sake of simplicity, and in preferred embodiments of the invention, the transmission gears 5 and 6 cannot be shifted in axial direction, but a clutch-coupling sleeve, not shown, can be shifted in opposite axial directions for coupling the respective transmission gears to each other.

If it is desired that the rotary speed $n_1$, $n_2$, $n_3$, and $n_4$ are independent of the direction of rotation, the following conditions must be present:

1. The first transmission gear 3 and the second transmission gear 4 must have the same number of teeth, and the third transmission gear 7 meshes only with the second transmission gear 4.

2. The fourth transmission gear 5 and the fifth transmission gear 6 must have the same number of teeth, and must both mesh with the sixth transmission gear 8.

These conditions can only be obtained when the teeth of the transmission gears are corrected, as schematically shown in the drawing, particularly in FIGS. 3 and 4, by a corresponding diameter of the respective gears. In this connection the following should be noted:

In order to maintain the above conditions, the distances between the transmission shafts X, Z, and Y, Z, respectively, should not be equal in FIGS. 1 and 3, but on the other hand the distance between the transmission shafts X, Z, and Y, Z, respectively, should be equal as shown in FIG. 4. In order to comply with both conditions, and to avoid a substantial correction of the gears, the distances between the axes in accordance with both conditions are averaged so that distances between the transmission shafts X and Z, and Y, Z are slightly different, which means that transmission gears 3 and 7, see FIG. 3, receive a negative correction, while transmission gears 5 and 8, see FIG. 4, receive a positive correction.

Due to design requirements, or due to the desired transmission ratio, it is not always possible to make the first and second transmission gears 3 and 4 large enough for meshing. In this event, as shown in FIG. 7, an intermediate gear 14 of any desired size, is mounted on an additional shaft 12 in a position meshing with the first and third transmission gears 3 and 7. The effect is the same as if transmission gears 3 and 4 would directly mesh.

As mentioned above, it is possible to obtain four output speeds $n_1$ to $n_4$ not only in forward direction of rotation, but also in reverse direction of rotation, so that eight speeds of the output shaft are possible. The ratio between the rotary speeds $n_1 : n_2$ within the range of high speeds, and the ratio between the rotary speeds $n_3 : n_4$, within the range of low speeds, is the same, and results from the construction of the transmission.

The height of the high rotary speeds $n_1$ and $n_2$ is determined by the first pair of change gears A, B, and the height of the lower rotary speeds $n_3$ and $n_4$ is determined by the second pair of change gears C, D.

For a particular group of change gears, four rotary speeds $n_1$ to $n_4$ can be selected for the same direction of rotation, and furthermore, the rotary speeds $n_2$ and $n_4$ are obtained in the reverse direction of rotation. For a particular arrangement of the change gears, as shown in FIGS. 1 and 2, four rotary speeds $n_1$ to $n_4$ during forward rotation, and two rotary speeds $n_2$ and $n_4$ result during reverse rotation, while with the arrangement of the change gears in accordance with FIGS. 5 and 6, four rotary speeds $n_1$ to $n_4$ are obtained during reverse rotation, and two rotary speeds $n_2$ and $n_4$ are obtained during forward rotation.

It may be noted that the reversal of the direction of rotation, without reversing the drive motor 30, can be obtained by exchanging the respective change gears on the transmission shaft W, X and Y. Since it is not necessary to reverse the electric motor 30, the same can be used also for driving machines which have to be rotated in one direction of rotation only, such as pumps or control shafts.

In this connection, it should be noted that the transmission of the invention can be braked at the fourth transmission shaft Z by operating the third and sixth clutch means $K_1$ and $K_2$ on the fourth transmission shaft Z, and also operating the fourth or fifth clutch means $K_5$ or $K_6$, without requiring stopping of drive motor 30, which permits the use of the same for driving other machinery in addition to the input shaft of the transmission.

By way of example, in one specific embodiment of the invention in which change gears A, B, C, and D respectively have 65, 29, 20 and 74 teeth, and in which transmission gears 3, 4, 7, 5, 6, 8, 9, and 10 respectively have 45, 45, 46, 21, 21, 52, 55, and 70 teeth, and in which the rotary speed of the drive motor 30 is 1465 R/per minute, the output shaft S can be operated at four different speeds $n_1$, $n_2$, $n_3$ and $n_4$ which respectively are 1465 R/ per minute, 605 R/per minute, 395 R/per minute, and 165 R/per minute.

In order to facilitate the understanding of the interrelation between the obtained output speeds with the operation of the clutch means, the following table is provided which indicates the rotary output speeds obtained by operation of selected clutches.

The lower portion of the table shows the change gears which must be attached to the respective transmission shafts in order to obtain the directions of rotation indicated in the upper part of the table. The symbol B/C means that the respective two change gears B and C are positioned in the left column on transmission shaft X, and in the right column on transmission shaft Y.

| R/min | Direction of Rotation | Engaged Clutches | Direction of Rotation | Engaged Clutches |
|---|---|---|---|---|
| $n_1$ | forward | K3, K1 | reverse | K4, K1 |
| $n_2$ | forward | K3, K6, K2 | reverse | K4, K6, K2 |
| $n_2$ | reverse | K3, K5, K2 | forward | K4, K5, K2 |
| $n_3$ | forward | K4, K1 | reverse | K3, K1 |
| $n_4$ | forward | K4, K6, K2 | reverse | K3, K6, K2 |
| $n_4$ | reverse | K4, K5, K2 | forward | K3, K5, K2 |
| $n_0$ | — | K1, K2, K5 od. K6 | — | K1, K2, K5 od. K6 |

| Change Gears | Transmission Shafts | for change gears |
|---|---|---|
| A | W | W |
| B/C | X | Y |
| D | Y | X |

Figure 9:
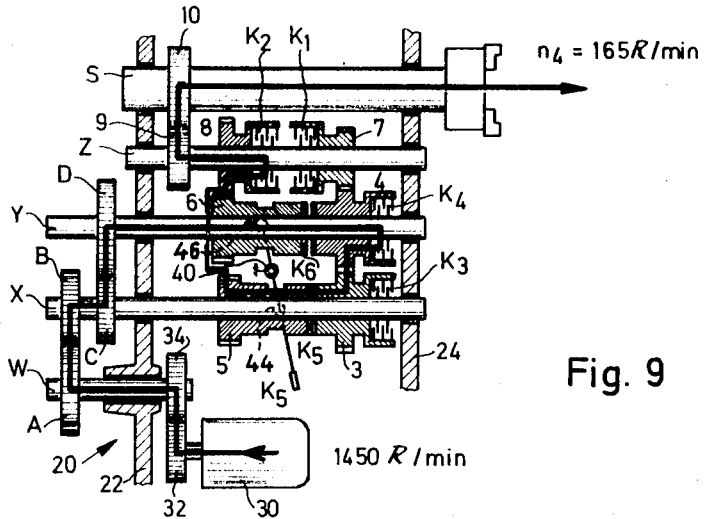
FIG. 9 is a sectional exploded view corresponding to FIG. 1 and including a line schematically illustrating the path of the force as the output shaft rotates at the lowest speed in a reverse direction.

FIGS. 8 and 9 indicate the paths of the forces through the transmission by a line provided with an arrowhead. The speed $n_4$, for example 165 R/min is in forward direction in FIG. 8, and in reverse direction in FIG. 9. In the position of FIG. 8, clutch K6, and in the position of FIG. 9, clutch K5 is engaged.

The path of the force for all rotary speeds and in forward and reverse direction, will now be shortly described by stating the operative elements of the transmission. The path of the force for the rotary speeds $n_1$ to $n_4$ in accordance with the left column of the preceding table, with reference to FIGS. 1 and 2, is as follows:

Rotary speed $n_1 = 1465$ R/min., forward
Transmission shaft W, change gears A, B, transmission shaft X, clutch K3, transmission gears 3, 4, 7, clutch K1, transmission shaft Z, gears 9, 10, output shaft S.

Rotary Speed $n_2 = 605$ R/min., forward
Transmission shaft W, change gears A, B, transmission shaft X, clutch K3, transmission gears 3, 4, clutch K6, transmission gears 6, 8, clutch K2, transmission shaft Z, gears 9, 10, output shaft S.

Rotary Seed $n_2 = 605$ R/min., reverse
Transmission shaft W, change gears A, B, transmission shaft X, clutches K3, K5, transmission gears 5, 8, clutch K2, transmission shaft Z, gears 9, 10, output shaft S.

Rotary Speed $n_3 = 395$ R/min., forward
Transmission shaft W, change gears A, B, transmission shaft X, change gears C, D, transmission shaft Y, clutch K4, transmission gears 4, 7, clutch K1, transmission shaft Z, gears 9, 10, output shaft S.

Rotary Speed $n_4 = 165$ R/min., forward
Transmission shaft W, change gears A, B, transmission shaft X, change gears C, D, transmission shaft Y, clutches K4, K6, transmission gears 6, 8, clutch K2, transmission shaft Z, gears 9, 10, output shaft S.

Rotary Speed $n_4$ 165 R/min., reverse
Transmission shaft W, change gears A, B, transmission shaft X, change gears C, D, transmission shaft Y, clutch K4, transmission gears 4, 3, clutch K5, transmission gears 5, 8, clutch K2, transmission shaft Z, gears 9, 10, output shaft S.

The path path of the force for the rotary speed $n_1$ to $n_4$ in accordance with the right column of the preceding table, see FIGS. 5 and 6, is as follows:

Rotary Speed $n_1 = 1465$ R/min., reverse
Transmission shaft W, change gears A, B, transmission shaft Y, clutch K4, transmission gears 4, 7, clutch K1, transmission shaft Z, gears 9, 10, output shaft S.

Rotary Speed $n_2 = 605$ R/min., reverse
Transmission shaft W, change gears A, B, transmission shaft Y, clutches K4, K6, transmission gears 6, 8, clutch K2, transmission shaft Z, gears 9, 10, output shaft S.

Rotary Speed $n_2 = 605$ R/min., forward
Transmission shaft W, change gears A, B, transmission shaft Y, clutch K4, transmission gears 4, 3, clutch K5, transmission gears 5, 8, clutch K2, transmission shaft Z, gears 9, 10, output shaft S.

Rotary Speed $n_3 = 395$ R/min., reverse
Transmission shaft W, change gears A, B, transmission shaft Y, change gears C, D, transmission shaft X, clutch K3, transmission gears 3, 4, 7, clutch K1, transmission shaft Z, gears 9, 10, output shaft S.

Rotary Speed $n_4 = 165$ R/min., reverse
Transmission shaft W, change gears A, B, transmission shaft Y, change gears C, D, transmission shaft X, clutch K3, transmission gears 3, 4, clutch K6, transmission gears 6, 8, clutch K2, transmission shaft Z, gears 9, 10, output shaft S.

Rotary Speed $n_4$ 165 R/min., forward
Transmission shaft W, change gears A, B, transmission shaft Y, change gears C, D, transmission shaft X, clutches K3, K5, transmission gears 5, 8, clutch K2, transmission shaft Z, gears 9, 10, output shaft S.

The transmission shaft Z, together with output shaft S, is blocked when the path of the force is closed in one of the two following positions:

1. Transmission gear 7, transmission gear 4, clutch K6, transmission gear 6, transmission gear 8.
2. Transmission gear 7, transmission gear 4, transmission gear 3, clutch K5, transmission gear 5, transmission gear 8.

In these positions, clutches K3 and K4 are disengaged so that the transmission shafts X, Y and W continue to rotate, driven by motor 30.

In the following claims, reference is made to first to fourth transmission shafts, and to first to sixth transmission gears and clutches, and the respective reference numerals can be ascertained from the following table.

|  | Transmission Shafts | Transmission Gears | Clutches |
|---|---|---|---|
| First | W | 3 | $K_3$ |
| Second | X | 4 | $K_4$ |
| Third | Y | 7 | $K_1$ |
| Fourth | Z | 5 | $K_5$ |
| Fifth |  | 6 | $K_6$ |
| Sixth |  | 8 | $K_2$ |

It will be understood that each of the elements described above, or two or more together, may also find a useful application in other types of speed change transmissions differing from the types described above.

While the invention has been illustrated and described as embodied in a transmission having four forward speeds and four reverse speeds, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. Speed change transmission comprising first, second, third and fourth transmission shafts, said first transmission shaft being the input shaft, and said fourth transmission shaft being operable at different speeds; change gears detachably fixed on said first, second, and third transmission shafts and including meshing pairs of change gears; six transmission gears including first and fourth transmission gears rotatably mounted on said second transmission shaft, second and fifth transmission gears rotatably mounted on said third transmission shaft, and third and sixth transmission gears rotatably mounted on said fourth transmission shaft, said first transmission gear having an operative connection with said second transmission gear for driving the same, said second transmission gear meshing with said third transmission gear, and said fourth and fifth transmission gears meshing with said sixth transmission gear, said first and second transmission gears having the same number of teeth, and said fourth and fifth transmission gears having the same number of teeth; and six clutch means including first, second, and third clutch means for selectively coupling said first transmission gear with said second transmission shaft, said second transmission gear with said third transmission shaft, and said third transmission gear with said fourth transmission shaft, respectively, fourth and fifth clutch means for selectively coupling said first and said fourth transmission gears, and said second and said fifth transmission gears, respectively, and sixth clutch means for selectively coupling said sixth transmission gear with said fourth transmission shaft whereby said fourth transmission shaft is operable at four reversable different speeds.

2. The transmission of claim 1, wherein said operative connection comprises in part an intermediate gear meshing with said first and third transmission gears; and means supporting said intermediate gear for rotation.

3. The transmission of claim 1 wherein said second transmission shaft, said first and fourth transmission gears, and said first and fourth clutch means form a first unit; and wherein said third transmission shaft, said second and fifth transmission gears, and said second and fifth clutch means form a second unit having the same shape as said first unit.

4. The transmission of claim 1 wherein said transmission shafts are parallel; and wherein said first transmission shaft is spaced the same distance from said second and third transmission shafts.

5. The transmission of claim 1 comprising an output shaft; and first and second meshing gears respectively fixed to said fourth transmission shaft and to said output shaft.

6. The transmission of claim 1 wherein at least said first, second third, and sixth clutch means are disk clutches operable during rotation of said first transmission shaft.

7. The transmission of claim 1 wherein said fourth and fifth clutch means include means for manually shifting the same.

8. The transmission of claim 1 wherein said fourth transmission shaft is braked to a stop when said third and sixth clutch means connect said third and sixth transmission gears with said fourth transmission shaft, while said fourth clutch means connects said first and fourth transmission gears, or said fifth clutch means connects said second and fifth transmission gears during rotation of said first transmission shaft.

9. The transmission of claim 1 comprising a supporting frame including bearing means for rotatably mounting said transmission shafts and including partitioning means; wherein said first, second, and third transmission shafts have portions projecting in the same direction from one side of said partitioning means; and wherein said change gears are mounted on said projecting portions.

10. The transmission of claim 1 wherein only one change gear is secured to said first transmission shaft.

* * * * *